US009118811B2

(12) United States Patent
Jung et al.

(10) Patent No.: US 9,118,811 B2
(45) Date of Patent: Aug. 25, 2015

(54) PREDICTED CONCURRENT STREAMING PROGRAM SELECTION

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 534 days.

(21) Appl. No.: 11/895,622

(22) Filed: Aug. 24, 2007

(65) Prior Publication Data

US 2009/0055546 A1   Feb. 26, 2009

(51) Int. Cl.
*H04N 7/16* (2011.01)
*H04N 21/433* (2011.01)
*H04N 21/45* (2011.01)
*H04N 21/466* (2011.01)
*H04N 21/84* (2011.01)

(52) U.S. Cl.
CPC ........... *H04N 7/163* (2013.01); *H04N 21/4334* (2013.01); *H04N 21/4508* (2013.01); *H04N 21/4667* (2013.01); *H04N 21/84* (2013.01)

(58) Field of Classification Search
CPC ... H04N 7/163; H04N 21/4334; H04N 21/84; H04N 21/4667; H04N 21/4508; H04N 7/16; H04N 7/173; G06F 15/16
See application file for complete search history.

(56) References Cited

U.S. PATENT DOCUMENTS

| 4,996,642 | A | * | 2/1991 | Hey ................................. 705/27 |
| 5,734,720 | A | * | 3/1998 | Salganicoff ................... 380/211 |
| 5,790,935 | A | * | 8/1998 | Payton ............................ 725/91 |
| 6,020,883 | A | * | 2/2000 | Herz et al. ..................... 715/721 |
| 7,158,097 | B2 | | 1/2007 | Taylor et al. |
| 7,437,438 | B2 | * | 10/2008 | Mogul et al. .................. 709/223 |
| 7,519,685 | B2 | * | 4/2009 | Nonaka et al. ................ 709/219 |
| 7,542,816 | B2 | * | 6/2009 | Rosenberg ...................... 700/94 |
| 8,175,582 | B2 | * | 5/2012 | Benco et al. ............... 455/414.1 |
| 2003/0046683 | A1 | * | 3/2003 | Jutzi ................................. 725/2 |
| 2003/0066090 | A1 | * | 4/2003 | Traw et al. .................... 725/114 |
| 2003/0126600 | A1 | * | 7/2003 | Heuvelman ..................... 725/35 |
| 2005/0076365 | A1 | * | 4/2005 | Popov et al. .................... 725/46 |
| 2005/0262533 | A1 | * | 11/2005 | Hart et al. ....................... 725/40 |
| 2008/0106600 | A1 | * | 5/2008 | Benco et al. .................. 348/157 |
| 2008/0140632 | A1 | * | 6/2008 | Pandya .............................. 707/3 |
| 2009/0006368 | A1 | * | 1/2009 | Mei et al. ......................... 707/5 |
| 2010/0002139 | A1 | * | 1/2010 | Park ............................. 348/565 |

OTHER PUBLICATIONS

Cooper, Sean; "Google pushes targeted ads to cellular providers, handset makers"; engadget.com; bearing dates of Aug. 2, 2007 and 2003-2007; pp. 1-5; Weblogs, Inc.; located at http://www.engadget.com/2007/08/02/google-pushes-targeted-ads-to-cellular-providers-handset-makers; printed on Aug. 2, 2007.

(Continued)

*Primary Examiner* — Ebrahim Golabbakhsh

(57) ABSTRACT

Embodiments provide an apparatus, a system, and a method. A method includes determining a characteristic of a streaming content selected by a user and currently being displayed. The method also includes identifying a concurrently available streaming content in response to the determined characteristic. The method further includes saving at least a portion of the identified concurrently available streaming content.

29 Claims, 11 Drawing Sheets

(56) References Cited

OTHER PUBLICATIONS

Kim, Jaihie; "Intelligent Process Control Via Gaze Detection Technology"; DTIC (Defense Technical Information Center); bearing a date of Aug. 3, 1999; pp. 1-2; STINET; located at http://stinet.dtic.mil/oai/oai?&verb=getRecord&metadataPrefix=htm . . . ; printed on Aug. 6, 2007.

Manjoo, Farhad; "Your TV is watching you"; Salon.com; bearing dates of Aug. 1, 2007 and May 8, 2003; pp. 1-4, 1-4, 1-5, and 1-4 (17 pages total); Salon Media Group, Inc.; located at http://dir.salon.com/story/tech/feature/2003/05/08/future_tv/index.html; printed on Aug. 1, 2007.

Park, Kang Ryoung; Kim, Jaihie; "Real-Time Facial and Eye Gaze Tracking System"; Institute of Electronics, Information and Communication Engineers; bearing dates of Mar. 26, 2004 and Jul. 28, 2004; pp. 1-2; Oxford Journals, Oxford University Press; located at http://ietisy.oxfordjournals.org/cgi/content/abstract/E88-D/6/1231; printed on Aug. 6, 2007.

Zhu, Zhiwei; Ji, Qiang; "Eye and gaze tracking for interactive graphic display"; Machine Vision and Applications; bearing a date of Jul. 2004; pp. 139-148; vol. 15, No. 3; Springer Berlin/Heidelberg; Abstract provided, pp. 1-2 and located at http://www.springerlink.com/content/3rxt9clyx87mr0mm/.

\* cited by examiner

FIG. 7

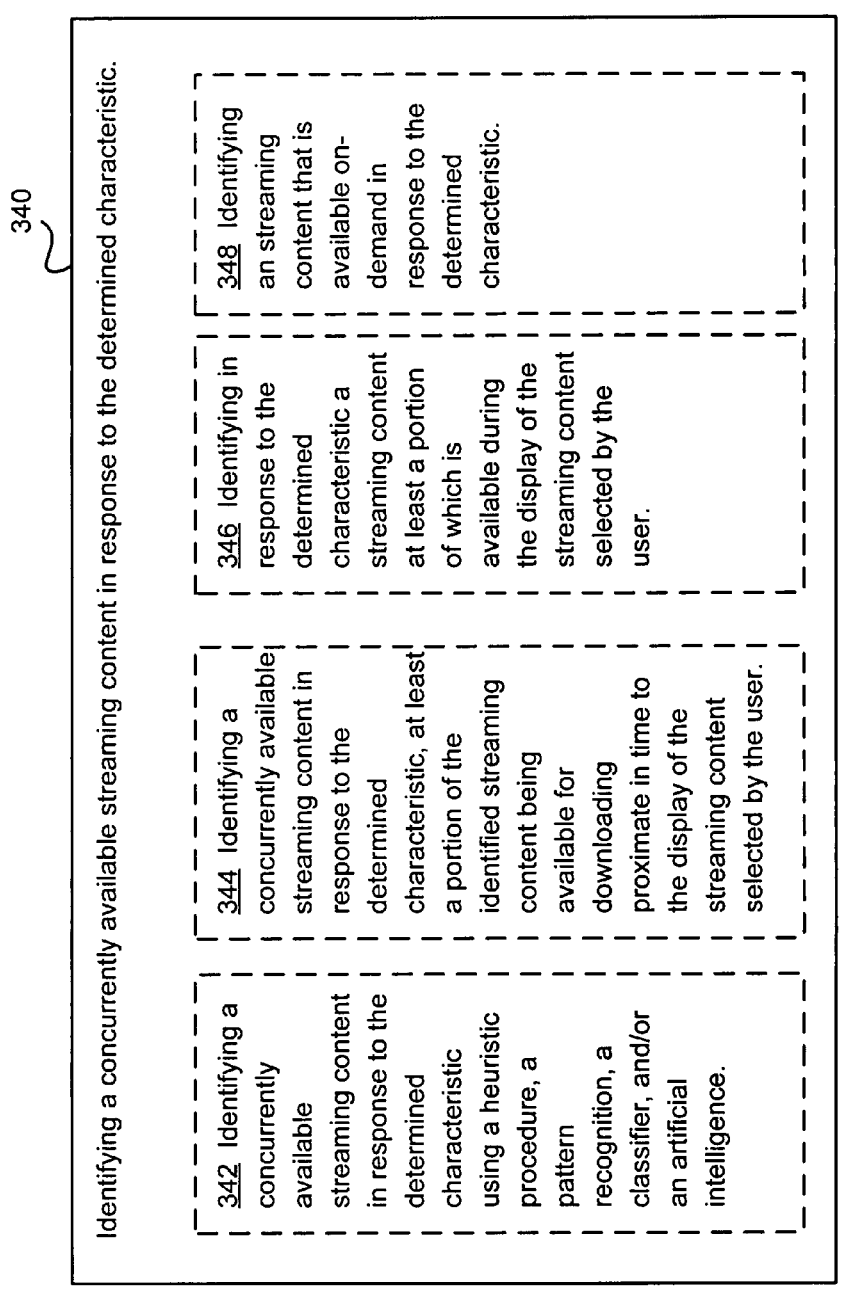

340

Identifying a concurrently available streaming content in response to the determined characteristic.

342 Identifying a concurrently available streaming content in response to the determined characteristic using a heuristic procedure, a pattern recognition, a classifier, and/or an artificial intelligence.

344 Identifying a concurrently available streaming content in response to the determined characteristic, at least a portion of the identified streaming content being available for downloading proximate in time to the display of the streaming content selected by the user.

346 Identifying in response to the determined characteristic a streaming content at least a portion of which is available during the display of the streaming content selected by the user.

348 Identifying an streaming content that is available on-demand in response to the determined characteristic.

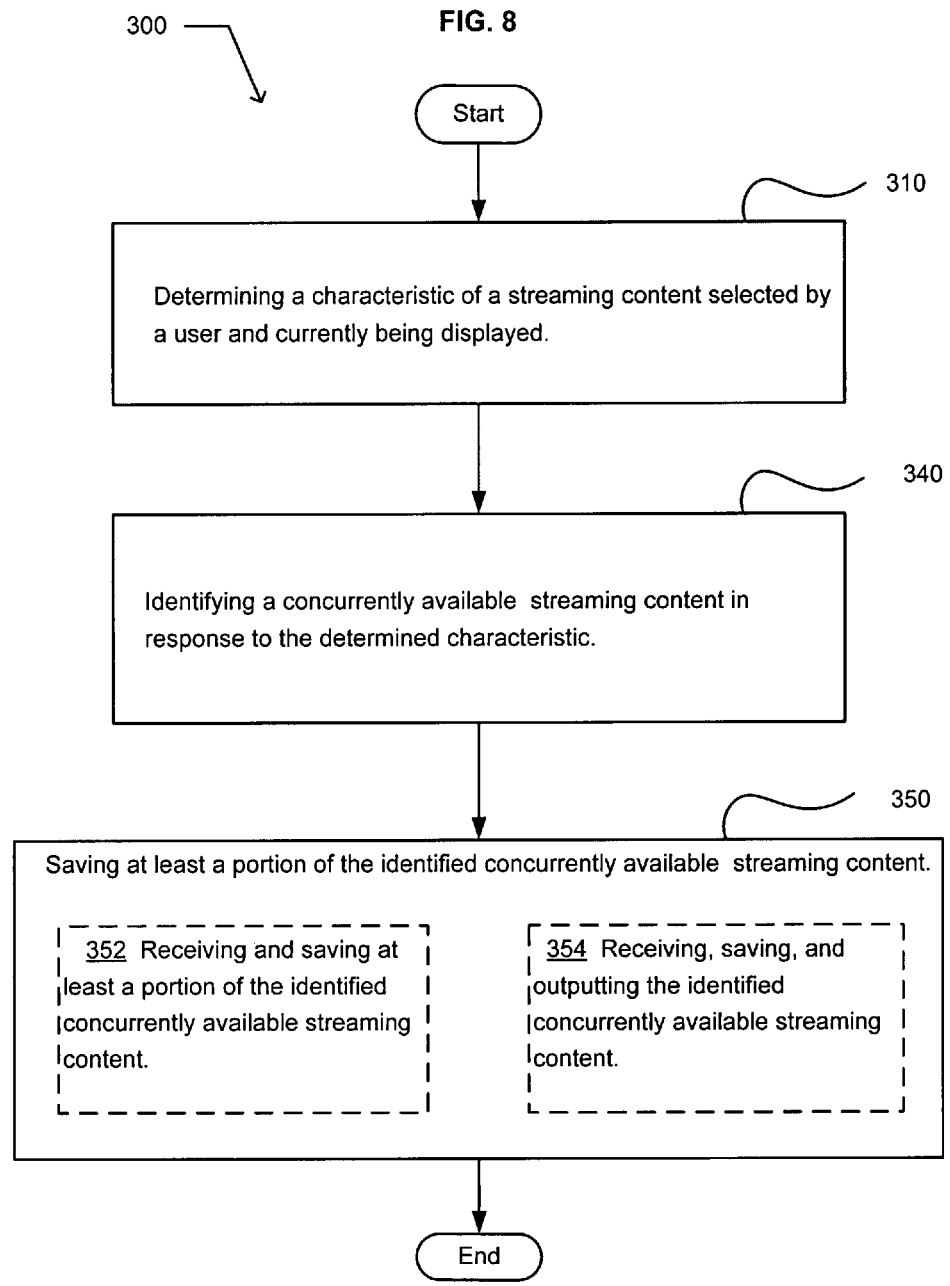

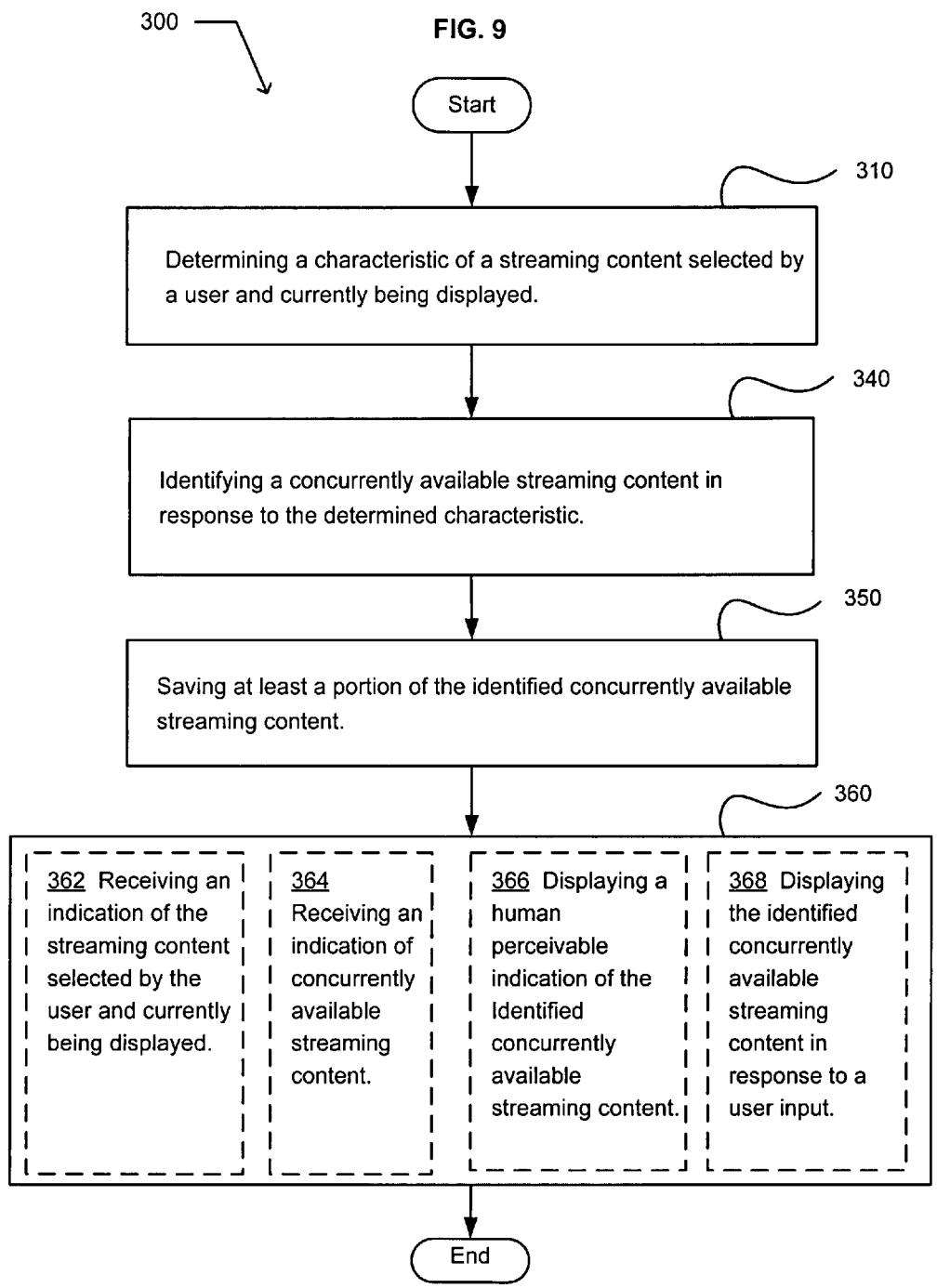

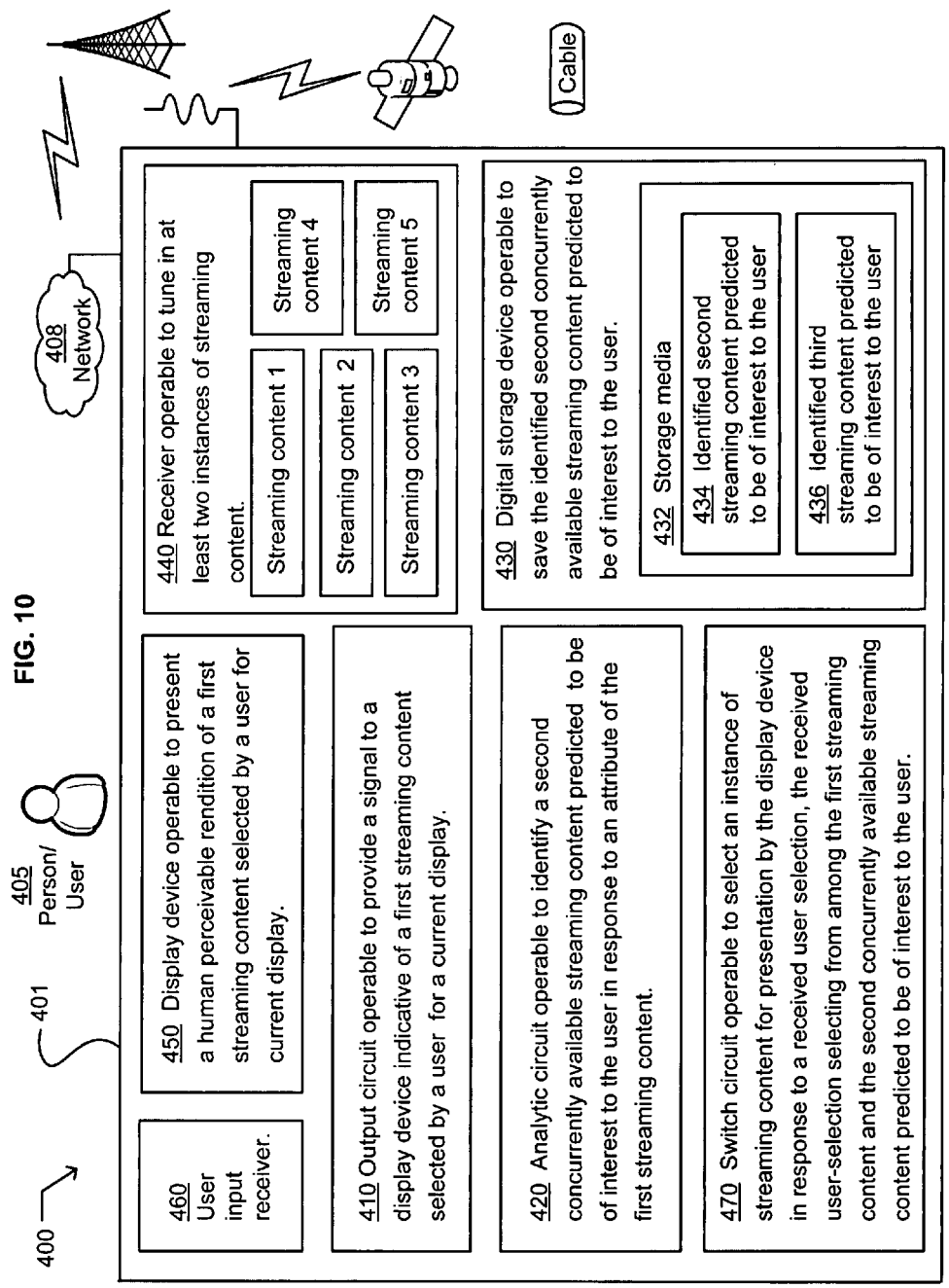

PREDICTED CONCURRENT STREAMING PROGRAM SELECTION

SUMMARY

An embodiment provides method. The method includes determining a characteristic of a streaming content selected by a user and currently being displayed. The method also includes identifying a concurrently available streaming content in response to the determined characteristic. The method further includes saving at least a portion of the identified concurrently available streaming content. In an embodiment, the method may include receiving an indication of the streaming content identified by the user and currently being displayed. In another embodiment, the method may include receiving an indication of the concurrently available streaming content. In a further embodiment, the method may include displaying a human perceivable indication of the availability of the identified substantially concurrent streaming content. In another embodiment, the method may include displaying the identified concurrently available streaming content in response to a user input. In addition to the foregoing, other method embodiments are described in the claims, drawings, and text that form a part of the present application.

Another embodiment provides a system. The system includes an output circuit operable to provide a signal to a display device indicative of a first streaming content selected by a user for a current display. The system also includes an analytic circuit operable to identify a second currently available streaming content predicted to be of interest to the user in response to an attribute of the first streaming content. The system further includes a digital storage device operable to save the identified second concurrently available streaming content predicted to be of interest to the user. In an embodiment, the system includes a switch circuit operable to select an instance of streaming content for presentation by the display device in response to a received user selection. The received user selection selecting from among the first streaming content and the second concurrently available streaming content predicted to be of interest to the user. In a further embodiment, the system includes a receiver circuit operable to tune in the at least two instances of streaming content. In addition to the foregoing, other system embodiments are described in the claims, drawings, and text that form a part of the present application.

A further embodiment provides an apparatus. The apparatus includes means for determining a characteristic of a streaming content selected by a user and currently being displayed. The apparatus also includes means for identifying a concurrently available streaming content in response to the determined characteristic. The apparatus further includes means for saving at least a portion of the identified concurrently available streaming content. In addition to the foregoing, other apparatus embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates a further alternative embodiment of the operational flow described in conjunction with FIG. 4;

FIG. 8 illustrates an alternative embodiment of the operational flow described in conjunction with FIG. 4;

FIG. 9 illustrates an alternative embodiment of the operational flow described in conjunction with FIG. 4;

FIG. 10 illustrates an example system;

DETAILED DESCRIPTION

Figure 1:
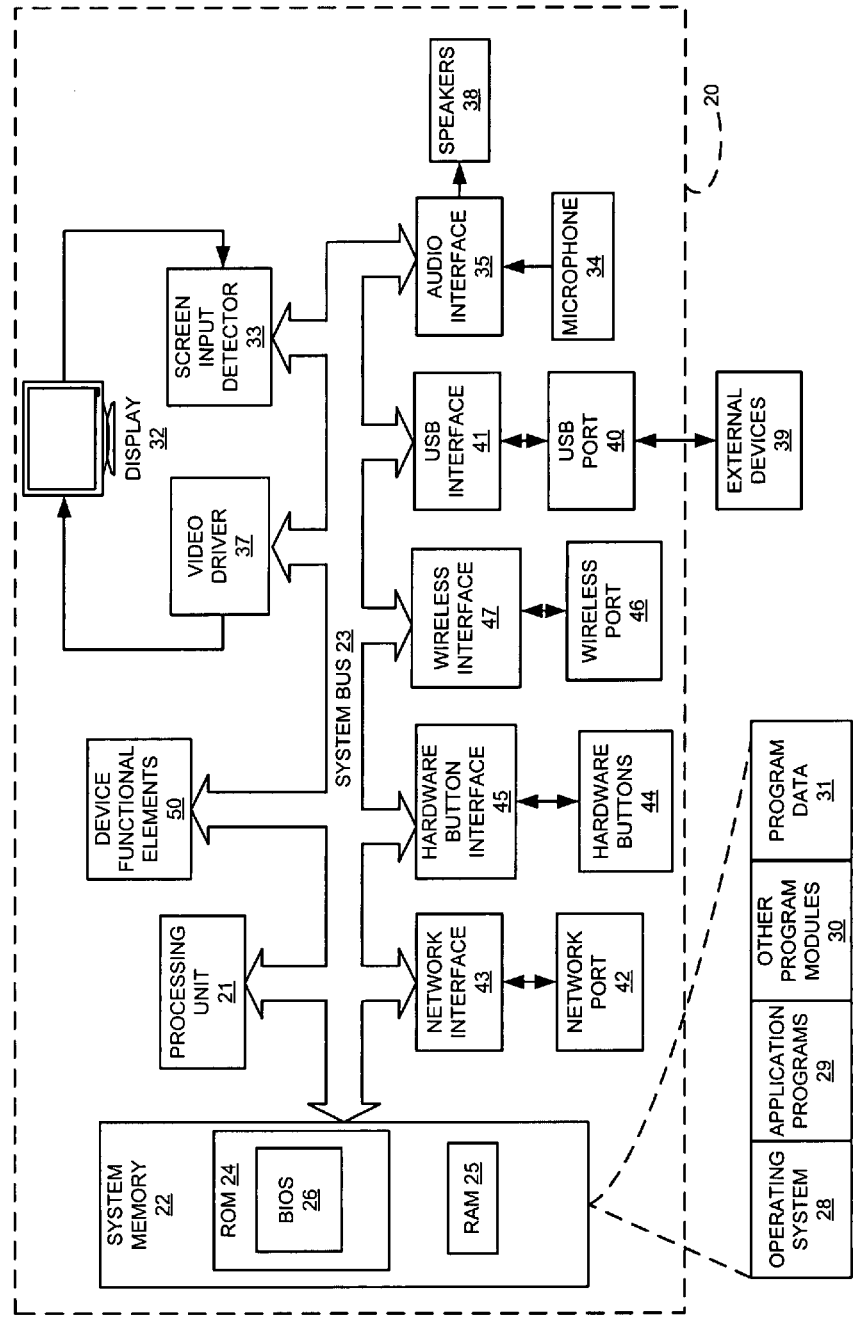
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
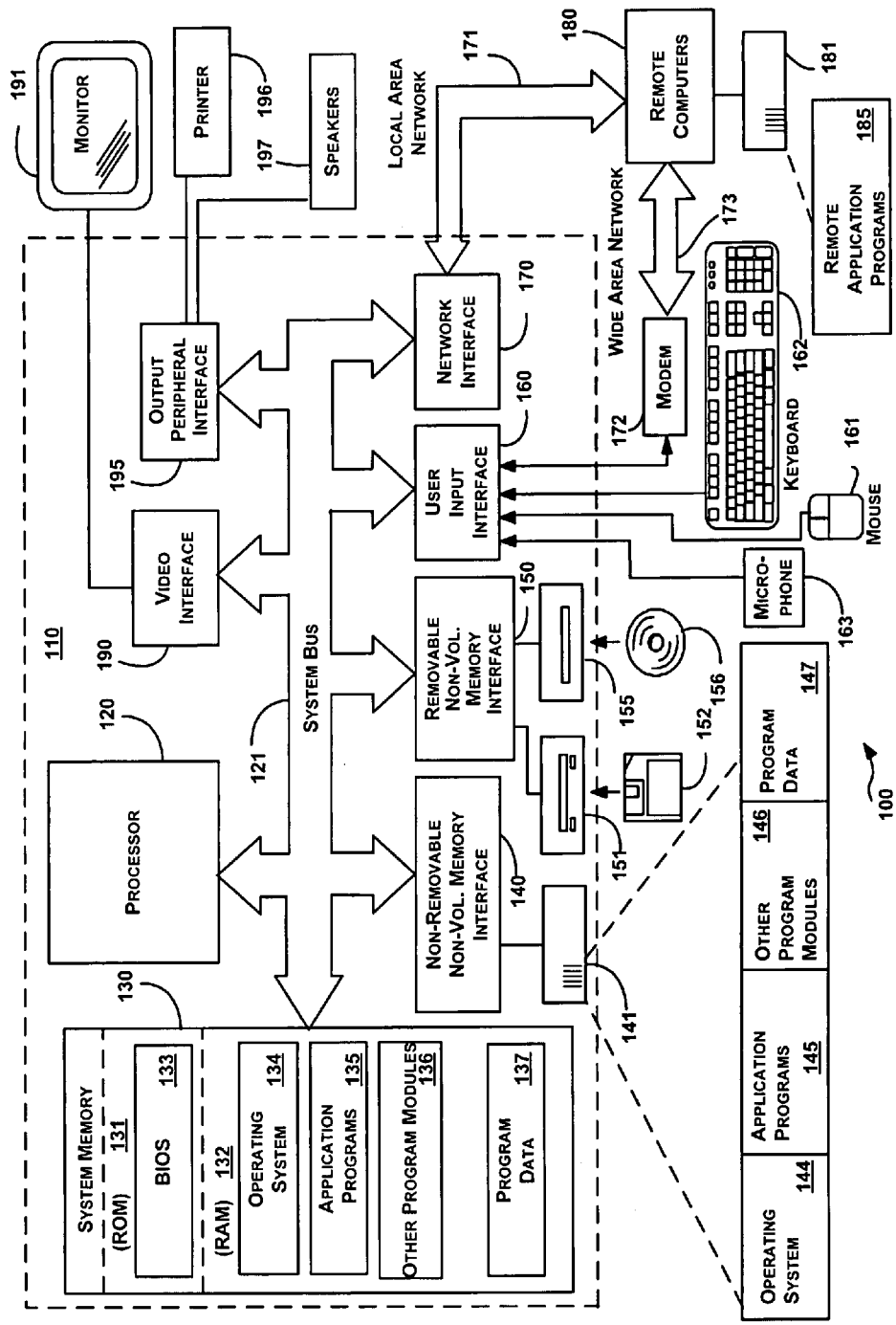
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
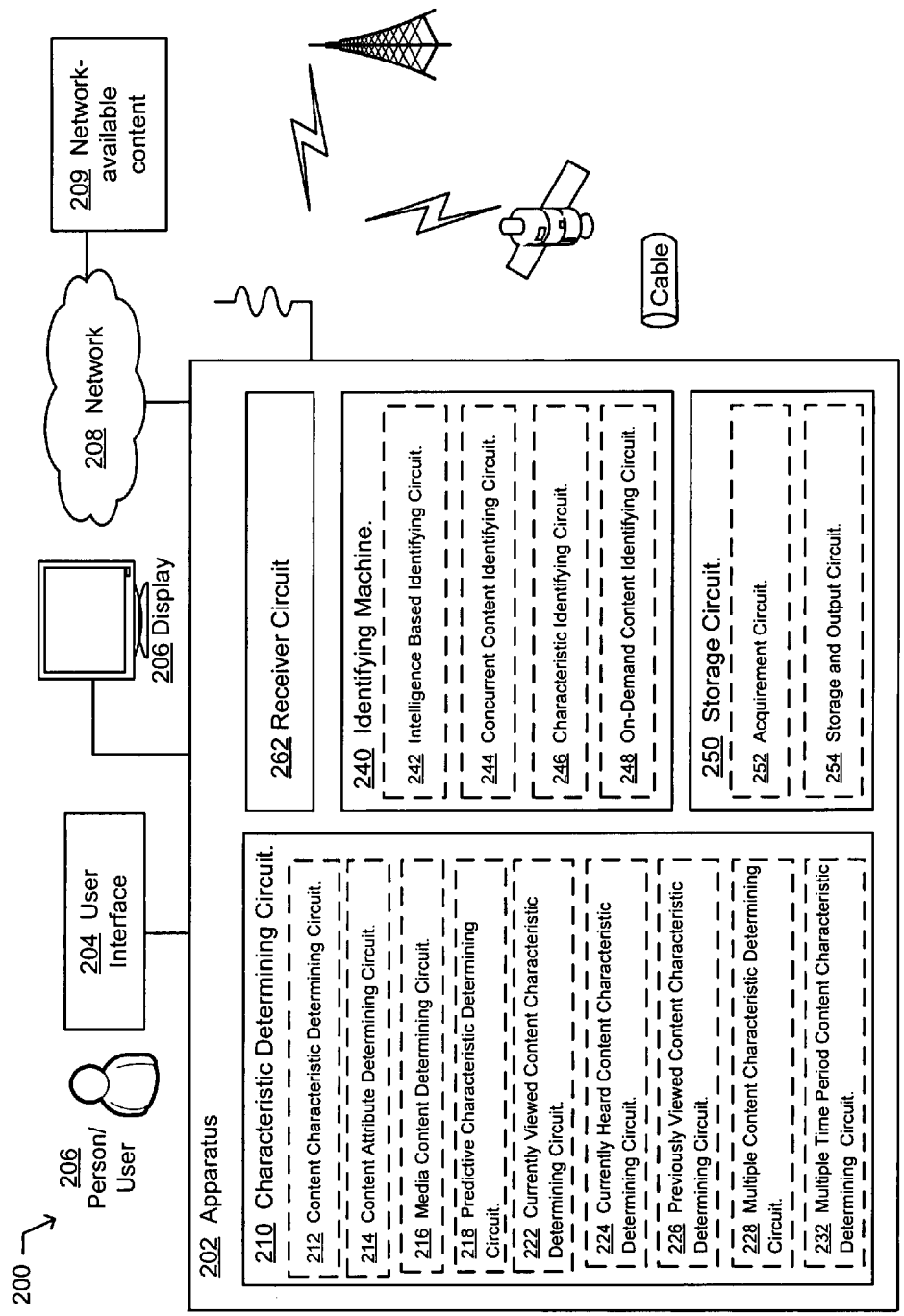
FIG. 3 illustrates an exemplary system in which embodiments may be implemented.

FIG. 3 illustrates an example system 200 in which embodiments may be implemented. The example system includes an apparatus 202, a user interface 204, and access to streaming content via a wireless link, a satellite link, and/or a wired link network 208. In an embodiment, the apparatus includes a characteristic determining circuit 210, an identifying machine 240, and a storage circuit 250. In some embodiments, one or more of the characteristic determining circuit, the identifying machine, and/or the storage circuit may be structurally distinct from the remaining circuits. In an embodiment, the apparatus or a portion of the apparatus may be implemented in whole or in part using the thin computing device 20 described in conjunction with FIG. 1 and/or the computing device 110 described in conjunction with FIG. 2. In another embodiment, the apparatus or a portion of the apparatus may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. A person 206 may via a user interface 204 use the apparatus 202 to access a streaming content via a network 208.

In an embodiment, the characteristic determining circuit 210 may include at least one additional circuit. The at least one additional circuit may include a content characteristic determining circuit 212, a content attribute determining circuit 214, a media content determining circuit 216, a predictive characteristic determining circuit 218, a currently viewed content characteristic determining circuit 222, a currently heard content characteristic determining circuit 224, a previously viewed content characteristic determining circuit 226, a multiple content characteristic determining circuit 228, and/or a multiple time period content characteristic determining circuit 232.

In another embodiment, the identifying machine 240 may include at least one additional circuit. The at least one additional circuit may include an intelligence based selecting circuit 242, a concurrent content selecting circuit 244, a characteristic selecting circuit 246, and/or an on-demand content selecting circuit 248.

In a further embodiment, the storage circuit 250 may include at least one additional circuit. The at least one additional circuit may include an acquirement circuit 252, and/or a storage and output circuit 254.

Figure 4:
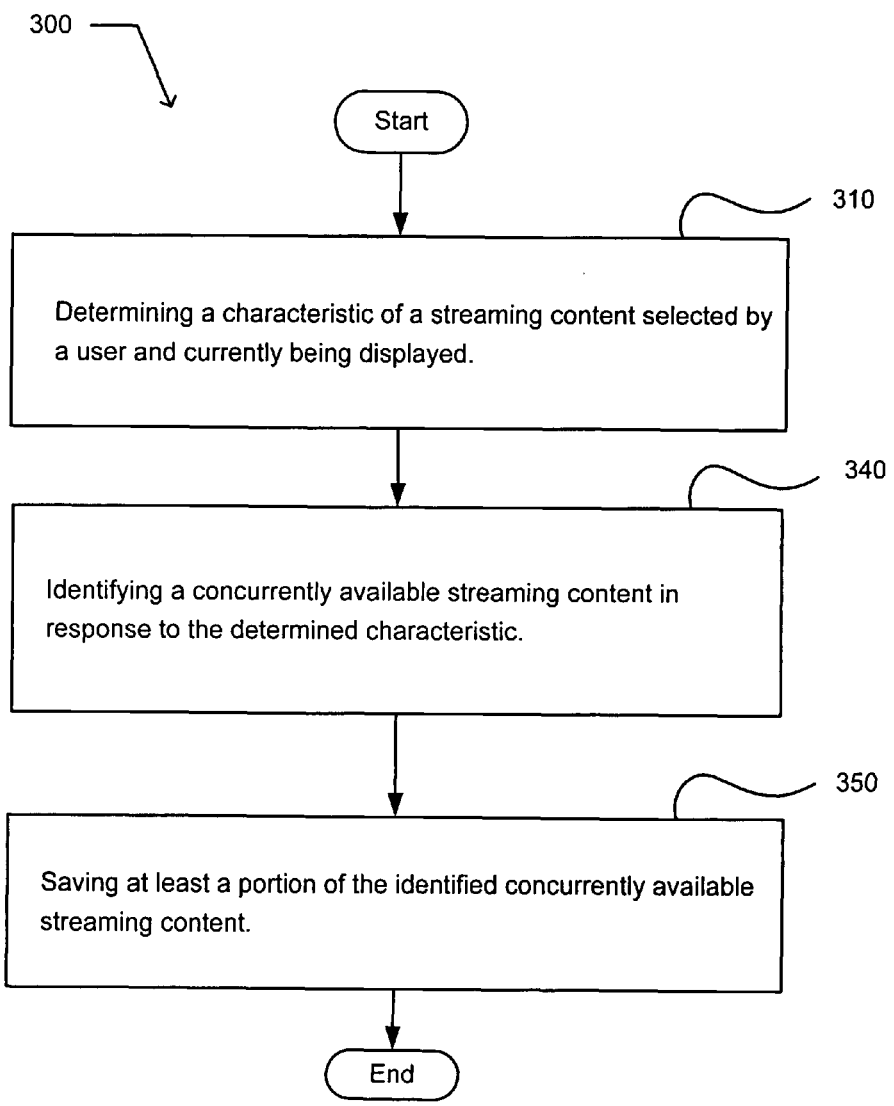
FIG. 4 illustrates an example of an operational flow.

FIG. 4 illustrates an example of an operational flow 300. FIG. 4 and several following figures may include various examples of operational flows, discussions, and explanations with respect to the above-described system 200 of FIG. 3, and/or with respect to other examples and contexts. However, it should be understood that the operational flows may be executed in a number of other environment and contexts, and/or in modified versions of FIG. 3. Also, although the various operational flows are illustrated in a sequence(s), it should be understood that the various operations may be performed in other orders than those which are illustrated, and/or may be performed concurrently.

After a start operation, the operational flow 300 includes an analytic operation 310 determining a characteristic of a streaming content selected by a user and currently being displayed. In an embodiment, the streaming content selected by a user may include television based content, such as scripted program, an unscripted program, a sports event, and/or a movie. In another embodiment, the streaming content selected by a user may include a similar content provided over a network, such as the Internet. In a further embodiment, the streaming content selected by a user may include a streaming content from the Internet, such as streaming content from YouTube.com, and/or MSNBC. In another embodiment, the streaming content may be received from a terrestrial or an extraterrestrial transmitter. The streaming content selected by the user may include a streaming content received by the apparatus 200 of FIG. 3 via a wireless link, a satellite link, and/or a wired link network 208. The analytic operation may be implemented in the characteristic determining circuit 210.

A correlation operation 240 identifies a concurrently available streaming content. In an embodiment, a concurrently available streaming content includes a streaming content that is available during at least a portion of time that the user-selected streaming content is displayed. For example, a movie available from a television station between 12 PM and 2 PM is concurrently available with a user-selected movie displayed between 11 AM and 1 PM. In another example, a movie available for on-demand downloading 24 hours a day is concurrently available with a user-selected DVD playing a movie at any time. In another embodiment, a concurrently available streaming content includes a streaming content that is available only during a time the user-selected streaming content is displayed. The correlation operation may be implemented in the identifying machine 240 of FIG. 3. A retention operation 350 saves the identified concurrently available streaming content. The retention operation may be implemented in the storage circuit 250. The operational flow then proceeds to an end operation.

Figure 5:
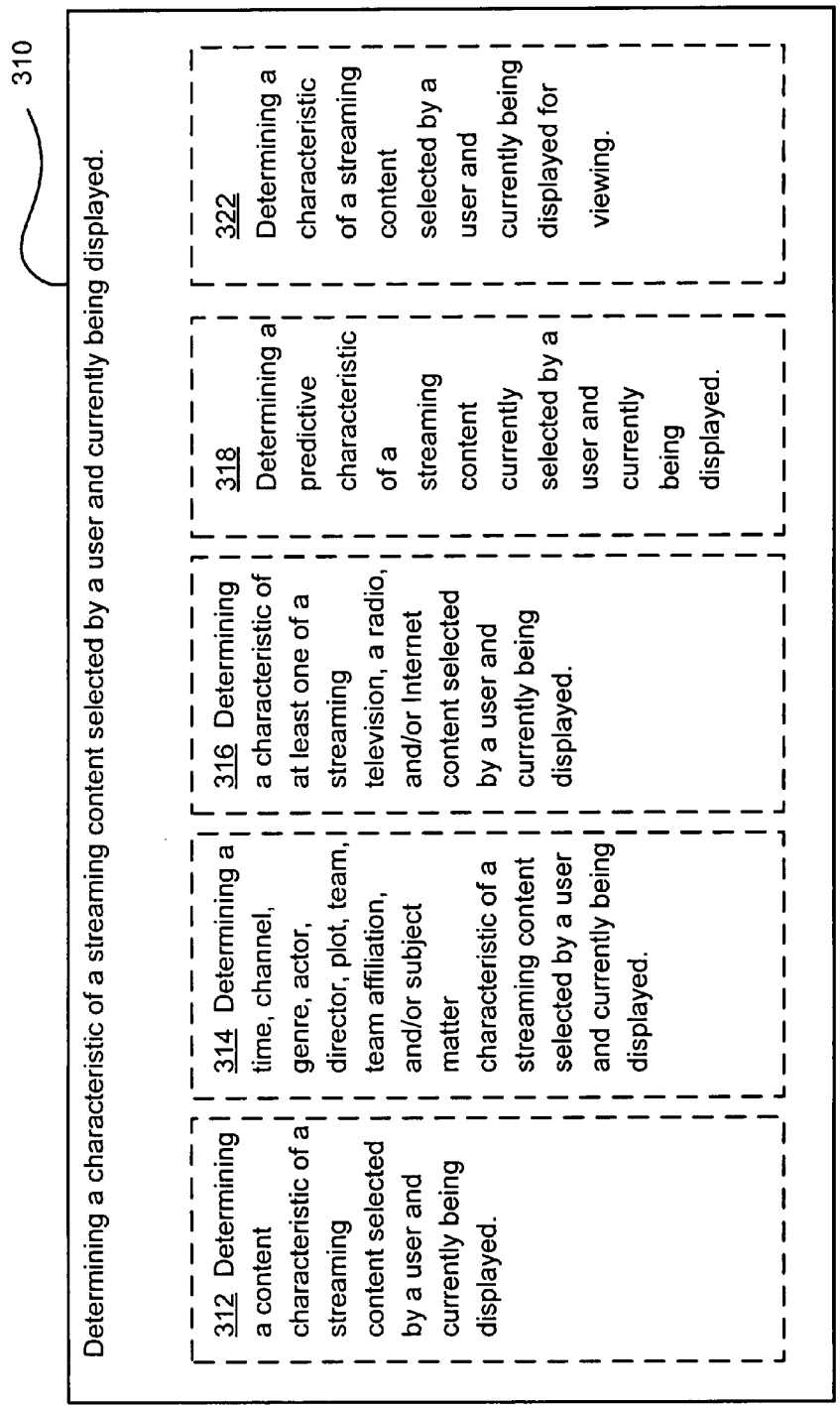
FIG. 5 illustrates an alternative embodiment of the operational flow described in conjunction with FIG. 4.

FIG. 5 illustrates an alternative embodiment of the operational flow 300 described in conjunction with FIG. 4. The analytic operation 310 may include at least one additional operation. The at least one additional operation may include an operation 312, an operation 314, an operation 316, an operation 318, and/or an operation 322. The operation 312 determines a content characteristic of a streaming content selected by a user and currently being displayed. In an embodiment, the operation 312 may be implemented in the content characteristic determining circuit 212. The operation 314 determines a time, channel, genre, actor, director, plot, team, team affiliation, and/or subject matter characteristic of a streaming content selected by a user and currently being displayed. For example, the determined content characteristic may be a particular sport, such as golf, football, soccer, or cycling. By way of further example, the determined content characteristic may be the home town of a team, such as Seattle, San Francisco, Chicago, or Boston. The operation 314 may be implemented in the content attribute determining circuit 214. The operation 316 determines a characteristic of at least one of a streaming television, radio, and/or Internet content selected by a user and currently being displayed. The operation 316 may be implemented in the media content determining circuit 216. The operation 318 determines a predictive characteristic of a streaming content currently selected by a user and currently being displayed. For example, the operation may determine that a predictive characteristic related to a leading actor or actress in a movie is a good predictive characteristic for the user and a predictive characteristic related to ice dancing is a poor predictive characteristic for the user. The operation 318 may be implemented in the predictive characteristic determining circuit 218. The operation 322 determines a characteristic of a streaming content selected by a user and currently being displayed for viewing. The operation 322 may be implemented in the currently viewed content characteristic determining circuit 222.

Figure 6:
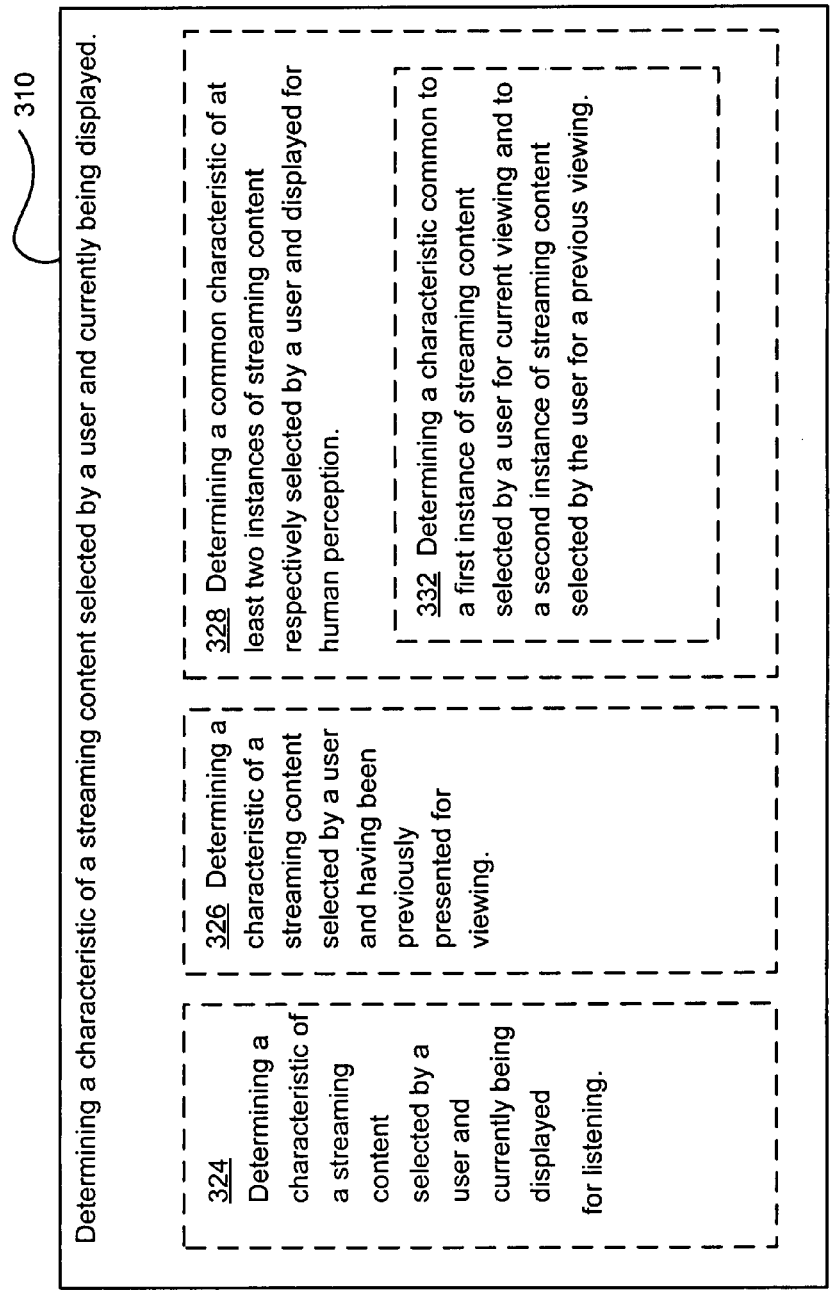
FIG. 6 illustrates another alternative embodiment of the operational flow described in conjunction with FIG. 4.

FIG. 6 illustrates another alternative embodiment of the operational flow 300 described in conjunction with FIG. 4. The analytic operation 310 may include at least one additional operation. The at least one additional operation may include an operation 324, an operation 326 an operation 328, and/or an operation 332. The operation 324 determines a characteristic of a streaming content selected by a user and currently being displayed for listening. The operation 324 may be implemented in the currently heard content characteristic determining circuit 226. The operation 326 determines a characteristic of a streaming content selected by a user and having been previously presented for viewing. The operation 326 may be implemented in the previously viewed content characteristic determining circuit 226. The operation 328 determines a common characteristic of at least two instances of streaming content respectively selected by a user and displayed for human perception. The operation 328 may be implemented in the multiple content characteristic determining circuit 228. The operation 332 determines a characteristic common to a first instance of streaming content selected by a user for current viewing and to a second instance of streaming content selected by the user for a previous viewing. The operation 332 may be implemented in the multiple time period content characteristic determining circuit 232.

FIG. 7 illustrates a further alternative embodiment of the operational flow 300 described in conjunction with FIG. 4. The correlation operation 340 may include at least one additional operation. The at least one additional operation may include an operation 342, an operation 344 an operation 346, and/or an operation 348. The operation 342 identifies a concurrently available streaming content in response to the determined characteristic using a heuristic procedure, pattern recognition, a classifier, and/or artificial intelligence. The operation 342 may be implemented in the intelligence based selecting circuit 242. The operation 344 identifies a currently available streaming content in response to the determined characteristic. At least a portion of the identified streaming content being available for downloading proximate in time to the display of the streaming content selected by the user. The operation 344 may be implemented in the concurrent content selecting circuit 244. The operation 346 identifies in response to the determined characteristic a streaming content at least a portion of which is available during the display of the streaming content selected by the user. The operation 346 may be implemented in the characteristic selecting circuit 246. The operation 348 identifies a streaming content that is available on-demand in response to the determined characteristic. The operation 348 may be implemented in the on-demand content selecting circuit 248.

FIG. 8 illustrates an alternative embodiment of the operational flow 300 described in conjunction with FIG. 4. The retention operation 350 may include at least one additional operation. The at least one additional operation may include an operation 352, and/or an operation 354. The operation 352 receives and saves at least a portion of the identified concurrently available streaming content. The operation 352 may be implemented in the acquirement circuit 252. The operation 354 receives, saves, and outputs the identified concurrently available streaming content. The operation 354 may be implemented in the storage and output circuit 254.

FIG. 9 illustrates an alternative embodiment of the operational flow 300 described in conjunction with FIG. 4. The operational flow may include at least one additional operation 360. The at least one additional operation may include an operation 362, an operation 364, an operation 366, and/or an operation 368. The operation 362 receives an indication of the streaming content selected by the user and currently being displayed. The operation 362 may be implemented in the receiver circuit 262 of FIG. 3. The operation 364 receives an indication of the concurrently available streaming content. The operation 362 may be implemented in the receiver circuit 262. The operation 366 displays a human perceivable indication of the identified substantially concurrently available streaming content. In an embodiment, the human perceivable indication of the concurrently availability of the selected streaming content is displayed to a user, such as the person/user 206. The operation 366 may be implemented in the display 206, such as for example, by a screen within a screen. The operation 368 displays the identified concurrently available streaming content in response to a user input. The operation 368 may also be implemented in the display 206.

FIG. 10 illustrates an example system 400. The system includes an output circuit 410, an analytic circuit 420, and a digital storage 430. The output circuit includes a circuit operable to provide a signal indicative of a first streaming content (illustrated as streaming content 1) selected by a user 405 to a display device 450 for current display. The analytic circuit includes a circuit operable to identify a second concurrently available streaming content 434 predicted to be of interest to the user in response to an attribute of the first streaming content. In an embodiment, the analytic circuit is operable to identify a second concurrently available streaming content, from among at least two other instances of concurrently available streaming content. The second concurrently available content is predicted to be of interest to the user in response to an attribute of the first streaming content. For example, the at least two other instances of streaming concurrently available content are illustrated as streaming content 2 and streaming content 3. The digital storage device includes a digital device operable to save the identified second concurrently available streaming content predicted to be of interest to the user. In an embodiment, the digital storage device includes computer storage media described in conjunction with FIG. 2.

In an alternative embodiment, the analytic circuit 420 includes an analytic circuit operable to identify a second concurrently available streaming content from among at least two other instances of streaming content. The second concurrently available streaming content is predicted in response to an attribute of the first streaming content to be of interest to the user. In another alternative embodiment, the system 400 further includes the display device 450. The display device is operable to present a human perceivable rendition of the first streaming content in response to the provided signal indicative of the first streaming content selected by a user for current display. In a further embodiment, the display device further includes a display device operable to simultaneously present the human perceivable rendition of a first streaming content to the user and an indication to the user of the identified second concurrently available streaming content predicted to be of interest to the user. For example, the simultaneous presentation may use a screen within screen on the display surface of the display device 450.

In another alternative embodiment, the system 400 further includes a switch circuit 470. The switch circuit is operable to select an instance of streaming content for presentation by the display device 450 in response to a received user-selection. The received user-selection selecting from among the first streaming content (illustrated as streaming content 1) and the identified second concurrently available streaming content predicted to be of interest to the user 434. In a further embodiment, the system further includes a receiver 440 operable to tune in the at least two instances of streaming content. For example, the receiver may include two separate receiver circuits each respectively operable to tune in a single instance of streaming content. The receiver may be scaled up accordingly with a separate receiver circuit for each instance of streaming content designed to be received. Alternatively, the receiver may include a single receiver circuit operable to tune in the at least two instances of streaming content.

Figure 11:
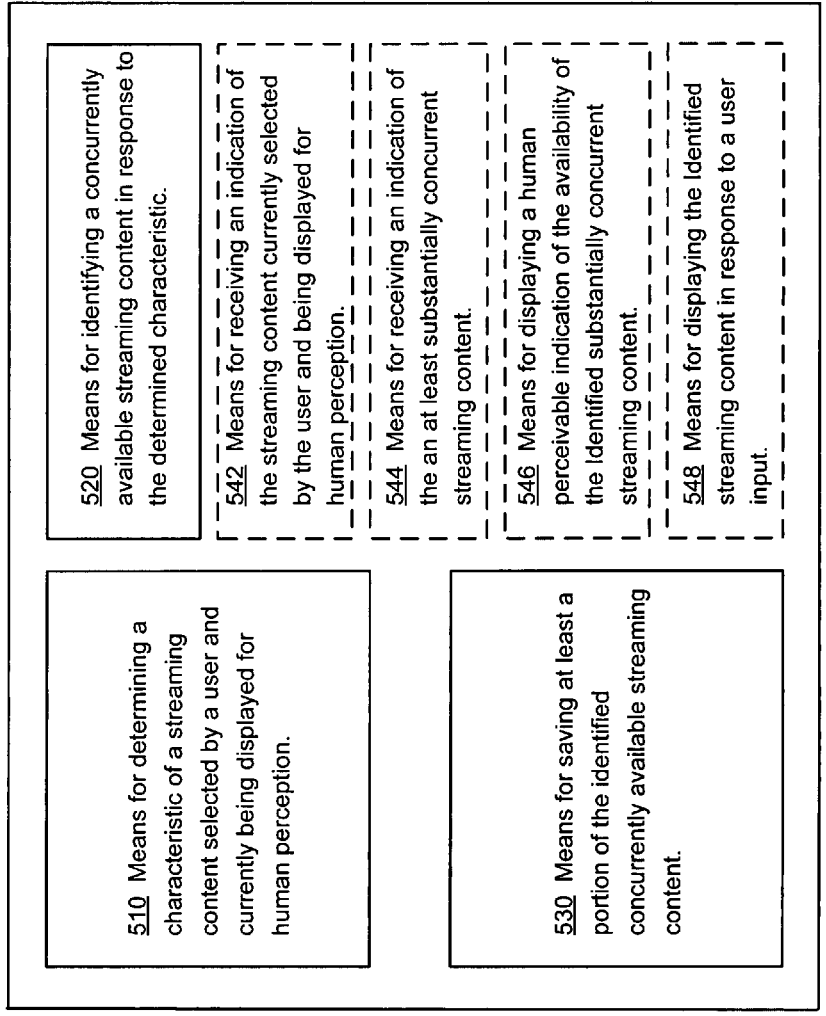
FIG. 11 illustrates an example apparatus.

FIG. 11 illustrates an example apparatus 500. The apparatus includes means 510 for determining a characteristic of a streaming content selected by a user and currently being displayed. The apparatus also includes means 520 for identifying a concurrently available streaming content in response to the determined characteristic. The apparatus further includes means 530 for saving at least a portion of the identified concurrently available streaming content.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    displaying at a thin computing device configured to be operated by a user a streaming content selected by the user and received at the thin computing device;

determining at the thin computing device a characteristic of the streaming content selected based on an indication of a selection by the user and currently being displayed at the thin computing device;

identifying at the thin computing device a concurrently available streaming content in response to the determined characteristic; and saving at least a portion of the identified concurrently available streaming content.

2. The method of claim 1, wherein the determining a characteristic of the streaming content selected based on an indication of a selection by a user and currently being displayed further includes at least one of:

determining a content characteristic of the streaming content selected based on an indication of a selection by the user and currently being displayed at the thin computing device;

determining a time, channel, genre, actor, director, plot, team, team affiliation, and/or subject matter characteristic of a streaming content selected based on an indication of a selection by the user and currently being displayed at the thin computing device;

determining a characteristic of at least one of a streaming television, a radio, and/or Internet content selected based on an indication of a selection by the user and currently being displayed at the thin computing device;

determining a predictive characteristic of a streaming content currently selected based on an indication of a selection by the user and currently being displayed at the thin computing device;

determining a characteristic of a streaming content selected based on an indication of a selection by the user and currently being displayed at the thin computing device for viewing;

determining a characteristic of a streaming content selected based on an indication of a selection by the user and currently being displayed at the thin computing device for listening; or determining a characteristic of a streaming content selected based on an indication of a selection by the user and having been previously presented for viewing.

3. The method of claim 1, wherein the identifying a concurrently available streaming content in response to the determined characteristic further includes at least one of:

identifying a concurrently available streaming content in response to the determined characteristic using a heuristic procedure, a pattern recognition, a classifier, and/or an artificial intelligence operable at the thin computing device configured to be operated by the user; or identifying a concurrently available streaming content in response to the determined characteristic, at least a portion of the identified streaming content being available for downloading proximate in time to the display of the streaming content selected based on an indication of a selection by the user.

4. The method of claim 1, wherein the identifying a concurrently available streaming content in response to the determined characteristic further includes:

identifying in response to the determined characteristic a streaming content at least a portion of which is available during the display of the streaming content selected based on an indication of a selection by the user.

5. The method of claim 1, wherein the identifying a concurrently available streaming content in response to the determined characteristic further includes:

identifying a streaming content that is available on-demand in response to the determined characteristic.

6. The method of claim 1, wherein the saving at least a portion of the identified concurrently available streaming content further includes:

receiving and saving at least a portion of the identified concurrently available streaming content.

7. The method of claim 1, wherein the saving at least a portion of the identified concurrently available streaming content further includes:

receiving, saving, and outputting the identified concurrently available streaming content.

8. The method of claim 1, further comprising:

receiving an indication of the streaming content selected based on an indication of a selection by the user and currently being displayed.

9. The method of claim 1, further comprising:

receiving an indication of concurrently available streaming content.

10. The method of claim 1, further comprising:

displaying at the thin computing device configured to be operated by the user a human perceivable indication of the identified concurrently available streaming content.

11. The method of claim 1, further comprising:

displaying the identified concurrently available streaming content in response to a user input.

12. The method of claim 1, wherein the determining a characteristic of the streaming content selected based on an indication of a selection by a user and currently being displayed further includes:

determining at the thin computing device configured to be operated by the user a common characteristic of at least two instances of streaming content respectively selected based on an indication of a selection by the user and displayed for human perception by the thin computing device configured to be operated by the user.

13. The method of claim 12, wherein the determining a common characteristic of at least two instances of streaming content selected based on an indication of a selection by the user and currently being displayed further includes:

determining a characteristic common to a first instance of streaming content selected based on an indication of a selection by the user for current viewing and to a second instance of streaming content selected based on an indication of a selection by the user for a previous viewing.

14. The method of claim 1 further comprising:

simultaneously displaying at the thin computing device configured to be operated by the user a human perceivable indication of the identified concurrently available streaming content and the streaming content selected based on an indication of a selection by the user.

15. The method of claim 1 further comprising:

presenting at the thin computing device configured to be operated by the user a human perceivable rendition of the identified concurrently available streaming content in response to a provided signal indicative of the identified concurrently available streaming content selected based on an indication of a selection by the user for current display; and simultaneously displaying at the thin computing device configured to be operated by the user a human perceivable rendition of the identified concurrently available streaming content and the streaming content selected based on an indication of a selection by the user.

16. The method of claim 1 wherein the thin computing device configured to be operated by the user includes at least one of:
a limited resource computing device, an electronic pen, a handheld electronic writing device, a digital camera, a scanner, an ultrasound device, an x-ray machine, a non-invasive imaging device, a cell phone, a printer, a refrigerator, a car, or an airplane.

17. The method of claim 1 further comprising:
concurrently tuning in at the thin computing device configured to be operated by the user at least the streaming content selected based on an indication of a selection by the user interface and currently being displayed and the identified concurrently available streaming content.

18. The method of claim 1, wherein the saving at least a portion of the identified concurrently available streaming content further includes:
saving at least a portion of the identified concurrently available streaming content at the thin computing device configured to be operated by the user.

19. The method of claim 1, further comprising:
receiving at the thin computing device configured to be operated by the user multiple streams of the streaming content from different sources concurrently.

20. The method of claim 1, further comprising:
receiving at the thin computing device configured to be operated by the user multiple streams of the streaming content from different sources concurrently; and
displaying at the thin computing device configured to be operated by the user at least two of the multiple streams of the streaming content from different sources concurrently.

21. The method of claim 1, further comprising:
receiving at the thin computing device configured to be operated by the user multiple streams of the streaming content from different sources concurrently; and
tuning in at the thin computing device configured to be operated by the user at least two of the multiple streams of the streaming content from different sources concurrently.

22. The method of claim 1, wherein identifying a concurrently available streaming content in response to the determined characteristic further comprises:
receiving at the thin computing device configured to be operated by the user multiple streams of the streaming content from different sources concurrently; and
identifying at the thin computing device configured to be operated by the user the concurrently available streaming content in the multiple streams of the streaming content from different sources.

23. The method of claim 1, wherein identifying a concurrently available streaming content in response to the determined characteristic further comprises:
displaying at a thin computing device that the concurrently available streaming content is available.

24. A system, comprising:
a thin computing device configured for operation by a user including at least:
a receiver circuit operable to receive at least one streaming content;
an output circuit operable to provide a signal to a display device indicative of a first streaming content selected based on input received from the user for a current display by the thin computing device;
an analytic circuit operable to identify a second concurrently available streaming content predicted to be of interest in response to an attribute of the first streaming content; and
a digital storage device operable to save an indication of the identified second concurrently available streaming content predicted to be of interest.

25. The system of claim 24, wherein the analytic circuit operable to identify a second concurrently available streaming content predicted in response to an attribute of the first streaming content to be of interest includes:
an analytic circuit operable to identify the second concurrently available streaming content from among at least two other instances of streaming content, the second concurrently available streaming content predicted in response to an attribute of the first streaming content to be of interest.

26. The system of claim 24, wherein the thin computing device configured for operation by the user further comprises:
a switch circuit operable to select an instance of streaming content for presentation by the display device in response to a signal received via the user interface, the instance of streaming content selecting from among the first streaming content and the second concurrently available streaming content predicted to be of interest.

27. The system of claim 24, wherein the thin computing device configured for operation by the user further comprises:
a receiver circuit operable to tune in the at least two instances of streaming content.

28. The system of claim 24 wherein the thin computing device configured to be operated by the user includes at least one of:
a limited resource computing device, an electronic pen, a handheld electronic writing device, a digital camera, a scanner, an ultrasound device, an x-ray machine, a non-invasive imaging device, a cell phone, a printer, a refrigerator, a car, or an airplane.

29. An apparatus comprising:
a thin computing device configured for operation by a user including at least:
means for displaying by the thin computing device operated by the user a streaming content selected based on an indication of a selection by the user and received by the thin computing device;
means for determining by the thin computing device operated by the user a characteristic of the streaming content selected based on an indication of a selection by the user and currently being displayed by the thin computing device operated by the user;
means for identifying by the thin computing device operated by the user a concurrently available streaming content in response to the determined characteristic; and
means for saving at least a portion of the identified concurrently available streaming content.

* * * * *